US008380492B2

United States Patent
Xu et al.

(10) Patent No.: US 8,380,492 B2
(45) Date of Patent: Feb. 19, 2013

(54) SYSTEM AND METHOD FOR TEXT CLEANING BY CLASSIFYING SENTENCES USING NUMERICALLY REPRESENTED FEATURES

(75) Inventors: Liqin Xu, Scarborough (CA); Hyun Chul Lee, Thornhill (CA)

(73) Assignee: Rogers Communications Inc., Toronto, Ontario (CA)

( * ) Notice: Subject to any disclaimer, the term of this patent is extended or adjusted under 35 U.S.C. 154(b) by 259 days.

(21) Appl. No.: 12/775,580

(22) Filed: May 7, 2010

(65) Prior Publication Data

US 2011/0093258 A1  Apr. 21, 2011

Related U.S. Application Data

(60) Provisional application No. 61/251,790, filed on Oct. 15, 2009.

(51) Int. Cl.
*G06F 17/27* (2006.01)
*G06F 17/20* (2006.01)
*G06F 17/21* (2006.01)

(52) U.S. Cl. .................. 704/9; 704/1; 704/10
(58) Field of Classification Search .......... 704/1, 9, 704/10; 707/754, 755
See application file for complete search history.

(56) References Cited

U.S. PATENT DOCUMENTS

| | | | | |
|---|---|---|---|---|
| 5,321,608 A * | 6/1994 | Namba et al. | ....... | 704/9 |
| 5,323,316 A * | 6/1994 | Kadashevich et al. | ....... | 704/9 |
| 6,104,990 A | 8/2000 | Chaney et al. | | |
| 6,810,375 B1 * | 10/2004 | Ejerhed | ....... | 704/9 |
| 7,010,479 B2 * | 3/2006 | Murata et al. | ....... | 704/9 |
| 7,162,413 B1 | 1/2007 | Johnson et al. | | |
| 7,263,530 B2 | 8/2007 | Hu et al. | | |
| 7,552,047 B2 * | 6/2009 | Pan et al. | ....... | 704/9 |
| 2003/0046263 A1 * | 3/2003 | Castellanos et al. | ....... | 707/1 |
| 2004/0083224 A1 | 4/2004 | Yoshida | | |
| 2005/0071148 A1 | 3/2005 | Huang et al. | | |
| 2007/0067157 A1 | 3/2007 | Kaku et al. | | |
| 2007/0067320 A1 * | 3/2007 | Novak | ....... | 707/100 |
| 2007/0225968 A1 | 9/2007 | Murakami et al. | | |
| 2007/0244882 A1 | 10/2007 | Cha et al. | | |
| 2008/0201411 A1 | 8/2008 | Paritosh | | |
| 2008/0243479 A1 * | 10/2008 | Cafarella et al. | ....... | 704/9 |
| 2009/0063132 A1 | 3/2009 | Miyazaki | | |
| 2009/0070327 A1 | 3/2009 | Loeser et al. | | |
| 2009/0116736 A1 | 5/2009 | Neogi et al. | | |

OTHER PUBLICATIONS

Arabic Keyphrase Extraction using Linguistic knowledge and Machine Learning techniques, Online: http://www.elda.org/medar-conference/pdf/6.pdf, 2009.

POS Tagger and Chunker for Tamil Language, Online: http://www.infitt.org/ti2009/papers/dhanalakshmi_POSTagger.pdf, 2009.

POS Tagging for German: How Important is the Right Context?, Online: http://jones.ling.indiana.edu/~skuebler/papers/postagging.pdf, 2008.

(Continued)

*Primary Examiner* — Jesse Pullias
(74) *Attorney, Agent, or Firm* — Rowand LLP

(57) ABSTRACT

A method and system for cleaning an electronic document are provided. The method comprises: identifying at least one sentence in the electronic document; numerically representing features of the sentence to obtain a numeric feature representation associated with the sentence; inputting the numeric feature representation into a machine learning classifier, the machine learning classifier being configured to determine, based on each numeric feature representation, whether the sentence associated with that numeric feature representation is a bad sentence; and removing sentences determined to be bad sentences from the electronic document to create a cleaned document.

16 Claims, 6 Drawing Sheets

OTHER PUBLICATIONS

Extraction of Text phrases using hierarchical grammar, Online: http://www.springerlink.com/content/clgl5mf4y57dewt7/fulltext.pdf?page=1, 2002.

Information Retrieval and websearch:Keyphrase Extraction, Online: www.cse.unt.edu/~rada/CSCE5200/Lectures/KeyphraseExtraction.ppt, Available online Oct. 29, 2009.

NLPR in TREC 2007 Blog Track, Online: http://nlpr-web.ia.ac.cn/2007papers/gjhy/gh132.pdf.

Text Summarization by Sentence Segment Extraction Using Machine Learning Algorithms, online: http://www.springerlink.com/content/06735277h5637774/, 2004.

"Special Issue on Noisy Text Analytics", International Journal on Document Analysis and Recognition, vol. 10, Nos. 3-4 (Dec. 2007) online: http://www.springerlink.com/content/qI711884654q/?p=c6beb20b8dfa4389b5e4daf2dd63618e&pi=0.

"Automated Patent Document Summarization for R&D Intellectual Property Management" Trappey et al. Proceedings of the 10th International Conference on Computer Supported Cooperatinve Work in Design May 3-5, 2006 p. 1-6 ISBN 1-4244-0164.

International Search Report dated Jul. 20, 2010.

International Search Report dated Jul. 28, 2010.

An Ontology-Based Approach for Key Phrase Extraction, Chan Q. Nguyen and Tuoi T. Phan, 2009.

Automatic Extraction and Learning Keyphrases from Scientific Articles, Yaakov HaCohen-Kerner, Zuriel Gross, and Asaf Masa, 2005.

Automatic Keyphrase Extraction from Scientific Documents using N-Gram Filtration Technique, 2008.

Context-Rule Model for Pos Tagging, Yu-Fang Tsai and Keh-Jiann Chen, 2003.

Unsupervised Information Extraction from Unstructured Ungrammatical Data Sources on the World Wide Web, Matthew Michelson and Craig A. Noblock, 2007.

* cited by examiner

SYSTEM AND METHOD FOR TEXT CLEANING BY CLASSIFYING SENTENCES USING NUMERICALLY REPRESENTED FEATURES

CROSS-REFERENCE TO RELATED APPLICATION

This application claims the benefit of and priority to U.S. Provisional Patent Application No. 61/251,790 filed Oct. 15, 2009 under the title SYSTEM AND METHOD FOR PHRASE EXTRACTION.

The content of the above patent application is hereby expressly incorporated by reference into the detailed description hereof.

TECHNICAL FIELD

The present disclosure relates generally to text mining. More specifically, it relates to a method and system for automatically removing text from documents in order to clean unwanted text from such documents.

BACKGROUND

Machine readable documents, such as electronic documents, may be processed to clean such documents. For example, such documents may be cleaned by removing unwanted text from such documents. Removing such text may be useful in order to make the documents more succinct. Removing such text may also make it easier to read and further process the document.

Manual cleaning of documents may be time-consuming. In processes in which further processing is performed on cleaned documents, manual document cleaning may create a bottleneck which results in reduced processing speeds. Furthermore, when cleaning large volumes of documents, manual cleaning may be impractical.

Thus, there exists a need for systems which automatically clean machine readable documents.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

In one aspect, the present disclosure provides a method of cleaning an electronic document. The method includes: identifying at least one sentence in the electronic document; numerically representing features of the sentence to obtain a numeric feature representation associated with the sentence; inputting the numeric feature representation into a machine learning classifier, the machine learning classifier being configured to determine, based on each numeric feature representation, whether the sentence associated with that numeric feature representation is a bad sentence; and removing sentences determined to be bad sentences from the electronic document to create a cleaned document.

In a further aspect, the present disclosure provides a document cleaning system for cleaning an electronic document. The document cleaning system includes a memory and one or more processors configured to: identify at least one sentence in the electronic document; numerically represent features of the sentence to obtain a numeric feature representation associated with the sentence; input the numeric feature representation into a machine learning classifier, the machine learning classifier being configured to determine, based on each numeric feature representation, whether the sentence associated with that numeric feature representation is a bad sentence; and remove sentences determined to be bad sentences from the electronic document to create a cleaned document.

Other aspects and features of the present application will become apparent to those ordinarily skilled in the art upon review of the following description of specific embodiments of the application in conjunction with the accompanying figures.

Figure 1:
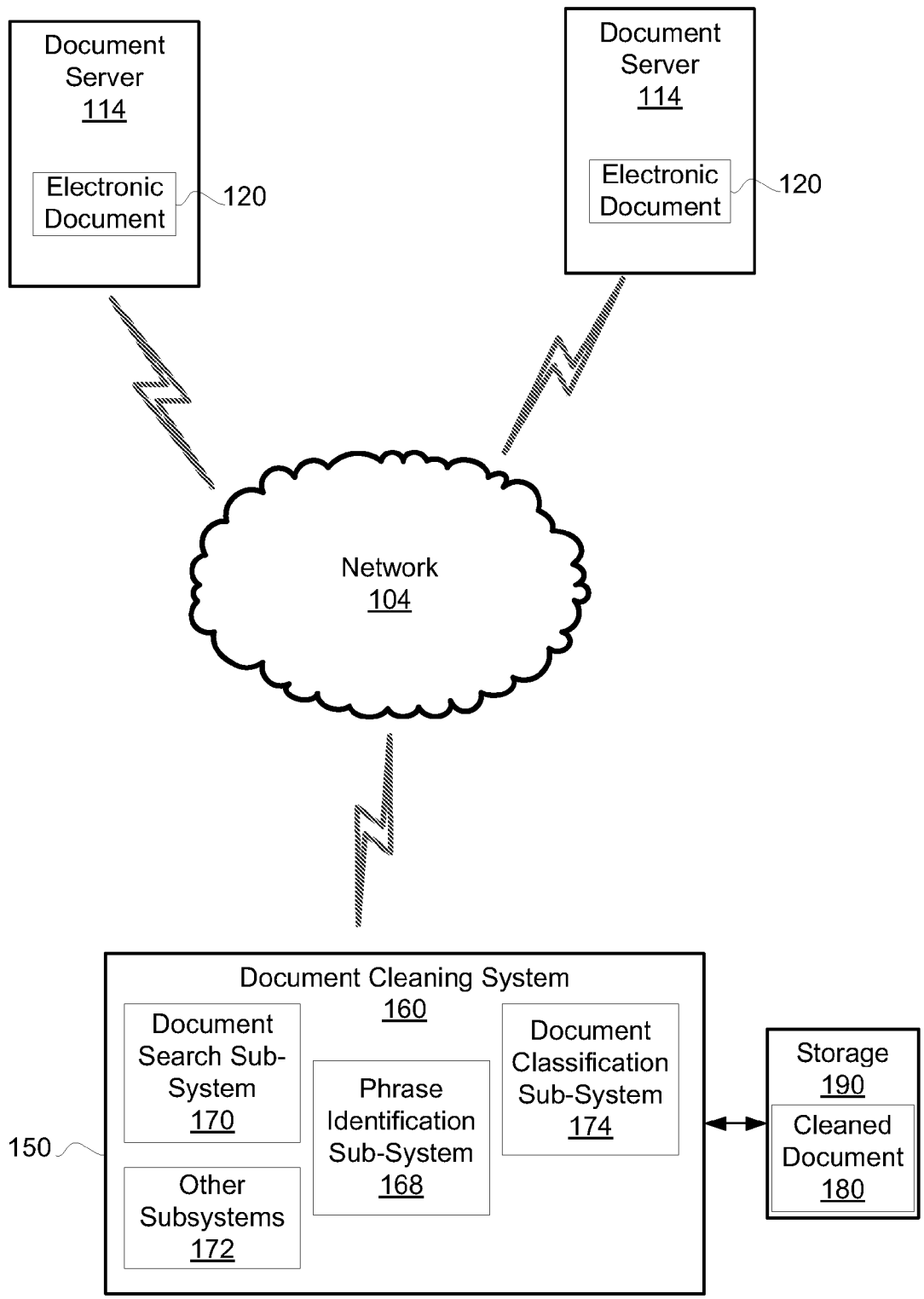
FIG. 1 shows a system diagram illustrating a possible environment in which embodiments of the present application may operate.

Reference is first made to FIG. 1, which illustrates a system diagram of a possible operating environment in which embodiments of the present disclosure may operate.

In the embodiment of FIG. 1, a document cleaning system 160 is illustrated. The document cleaning system 160 is configured to receive machine readable documents, such as electronic documents 120, and to clean those electronic documents 120 by removing text from the documents 120 to create cleaned documents 180. The text which is removed may be, for example, extraneous text which is unrelated to the unremoved text in the electronic document 120.

That is, the document cleaning system 160 functions to identify unwanted text (also referred to as bad text) in electronic documents 120 and to filter such unwanted text from the electronic documents 120 to form cleaned documents 180. The cleaned documents 180 contain at least some text from the original electronic documents 120 but do not contain the text identified as unwanted text. The removed text may be referred to as unwanted text or bad text. In contrast, the text which is not removed may be referred to as wanted text or good text.

The cleaned documents 180 may be stored in a storage 190 which is accessible by the document cleaning system 160. The storage 190 may, in some embodiments, be internal storage of the document cleaning system 160. In other embodiments, the storage 190 may be external storage of the document cleaning system 160, including, for example, network storage accessible through a network 104.

The electronic documents 120 may, in various embodiments, be one or more of: blogs, micro-blogs such as Twitter™, on-line news sources, user-generated comments from web-pages, etc. Other types of electronic documents 120 are also possible. By way of example and not limitation, the documents 120 may be formatted in a Hyper-Text Markup Language ("HTML") format, a plain-text format, a portable document format ("PDF"), or in any other format which is capable of representing text. Other document formats are also possible.

The electronic documents 120 may be located on a plurality of document servers 114, which may be accessible through a network 104, such as the Internet. In some embodiments, the document servers 114 may be publicly and/or privately accessible web-sites which may be identified by a unique Uniform Resource Locator ("URL").

The network 104 may be a public or private network, or a combination thereof. The network 104 may be comprised of a Wireless Wide Area Network (WWAN), A Wireless Local Area Network (WLAN), the Internet, a Local Area Network (LAN), or any combination of these network types. Other types of networks are also possible and are contemplated by the present disclosure.

The document cleaning system 160 may include functionality in addition to the ability to clean electronic documents 120 by removing unwanted or bad text. For example, as illustrated in FIG. 1, in some embodiments, the document cleaning system 160 may be a document aggregation system 150. The document aggregation system 150 may be configured to search document servers 114 to locate and/or group electronic documents 120 which are related to a common subject matter.

The electronic documents 120 may, in some embodiments, be news-related documents which contain information about recent and important events. In such cases, the document aggregation system 150 may also be referred to as a news aggregation system. The news aggregation system may be configured to locate and group electronic documents 120 which are related to a common event or story.

The document aggregation system 150 may, in some embodiments, include a phrase identification sub-system 168. The phrase identification sub-system 168 is configured to receive machine readable documents, such as the cleaned document 180, and to automatically identify phrases in those cleaned documents 180. Phrases are groups of words which function as a single unit in the syntax of a sentence within the cleaned document 180.

Other analysis or processing apart from that described above with reference to the phrase identification sub-system 168 may be performed on the cleaned documents 180. The document aggregation system 150 may, in some embodiments, include a document search subsystem 170. The document search subsystem 170 may be used by the document aggregation system 150 to locate documents accessible through the network 104, such as the electronic documents 120 on the document servers 114. The document search sub-system 170 may be configured to search document servers 114 based on a search algorithm in order to identify electronic documents 120 matching a search criteria. By way of example, in some embodiments, the search algorithm may provide for searching of websites (or other document servers 114) of a specific category using a search keyword or phrase. For example, the document search subsystem 170 may be configured to search blogs, micro blogs, and/or online traditional news sources, etc.

In some embodiments, phrases identified in electronic documents 120 by the phrase identification sub-system 168 may be used to search similar stories on news related Internet sites, blogs, and/or social networking sites, such as Twitter™, etc. That is, in at least some embodiments, the document search subsystem 170 may be configured to receive phrases identified in electronic documents 120 by the phrase identification sub-system 168 and to perform searches based on those phrases. The document search subsystem 170 may be configured to attempt to identify documents which relate to the same subject matter as an electronic document 120 which has already been analyzed by the phrase identification sub-system 168. The document search subsystem 170 may receive a phrase identified by the phrase identification sub-system 168 and provide that phrase to a search engine, which attempts to locate other documents 120 which include the same phrase.

In at least some embodiments, the documents identified in the search may be input to the document cleaning system 160, to produce cleaned documents 180 which include less text than the original electronic documents 120. That is, the documents 120 identified may be cleaned in order to remove unwanted or bad text in order to produce additional cleaned documents 180.

The search engine may, in some embodiments, be a third party search engine and may not be physically located within the document aggregation system 150. For example, a publicly accessible search engine, such as Google™ may be used.

In at least some embodiments, the document aggregation system 150 also includes a document classification sub-system 174 which associates electronic documents 120 with one or more labels. For example, the document classification subsystem 174 may associate the document 120 with a phrase identified by the phrase identification module 168. The label which is associated with the document 120 may be used to identify the subject matter of the electronic document 120.

The document aggregation system 150 may include other subsystems 172 not specifically described above. By way of example and not limitation, the document aggregation system 150 may, in some embodiments, include a ranking subsystem which ranks documents 120 or the subject of documents 120 based on frequency of use or frequency of occurrence. For example, the subjects of a plurality of documents 120 may be ranked by determining the frequency of occurrence of each label (such as a phrase) associated with documents 120. The rank may indicate, in at least some embodiments, how topical the subject matter associated with that label is.

In at least some embodiments, the document aggregation system 150 may include a web-interface subsystem (not shown) for automatically generating web pages which permit the accessing of the documents 120 on the document servers 114 and/or the cleaned documents 180 and/or other information about the documents 120. The other information may include a machine-generated summary of the contents of the document 120, and a rank of the subject matter of the document 120 as determined by the ranking subsystem (not shown). The web pages which are generated by the web-interface subsystem may group documents 120 by subject matter and/or by phrases which are used in the electronic documents 120.

By way of further example, the other subsystems 172 may also include a power subsystem for providing electrical power to electrical components of the document aggregation system 150 and a communication subsystem for communicating with the document servers 114 through the network 104.

It will be appreciated that the document cleaning system 160 (and/or the document aggregation system 150) may include more or less subsystems and/or functions than are discussed herein. It will also be appreciated that the functions provided by any set of subsystems may be provided by a single system and that these functions are not, necessarily, logically or physically separated into different subsystems.

Furthermore, while FIG. 1 illustrates one possible embodiment in which the document cleaning system 160 may operate, (i.e. where the document cleaning system 160 is a document aggregation system 150) it will be appreciated that the document cleaning system 160 may be employed in any system in which it may be useful to employ a machine in order to clean machine readable documents (such as the electronic documents 120).

Accordingly, the term document cleaning system 160, as used herein, is intended to include stand alone document cleaning systems which are not, necessarily, part of a larger system, and also document cleaning sub-systems which are part of a larger system (which may be the same or different than the document aggregation system 150 of FIG. 1). The term document cleaning system 160 is, therefore, intended to include any systems in which the document cleaning methods described herein are included.

In at least some embodiments, the document cleaning system 160, the phrase identification system 168, the document search sub-system 170, the document classification sub-system 174 and/or any of the other subsystems 172 may be implemented, in whole or in part, by way of a processor 240 which is configured to execute software modules 260 stored in memory 250. A block diagram of one such example document cleaning system 160, is illustrated in FIG. 2.

Figure 2:
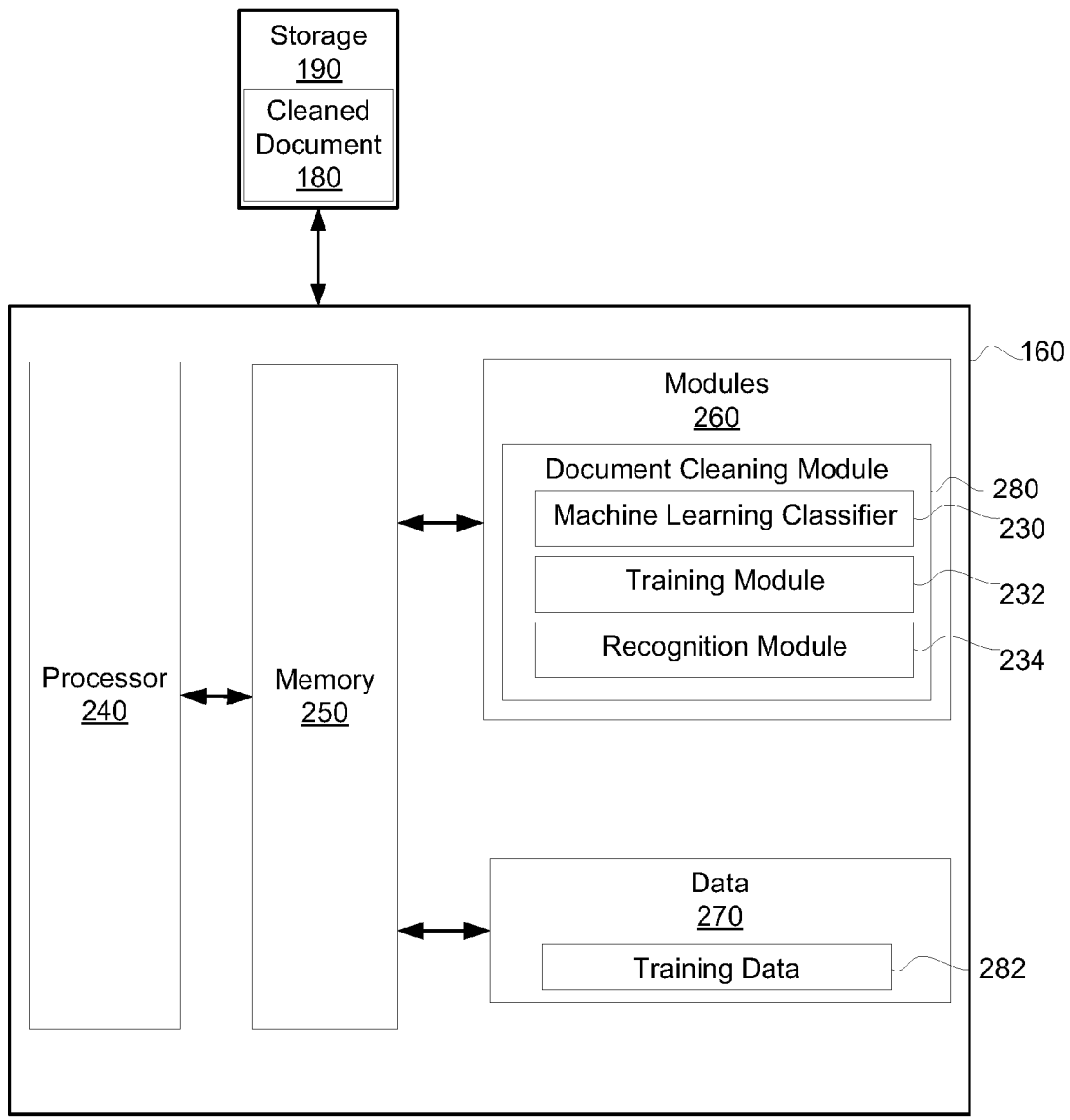
FIG. 2 shows a block diagram of a document cleaning system in accordance with an embodiment of the present disclosure.

In the embodiment of FIG. 2, the document cleaning system 160 includes a controller comprising one or more processor 240 which controls the overall operation of the document cleaning system 160. The document cleaning system 160 also includes memory 250 which is connected to the processor 240 for receiving and sending data to the processor 240. While the memory 250 is illustrated as a single component, it will typically be comprised of multiple memory components of various types. For example, the memory 250 may include Random Access Memory (RAM), Read Only Memory (ROM), a Hard Disk Drive (HDD), Flash Memory, or other types of memory. It will be appreciated that each of the various memory types will be best suited for different purposes and applications.

The processor 240 may operate under stored program control and may execute software modules 260 stored on the memory 250. The software modules 260 may be comprised of, for example, a document cleaning module 280 which is configured to identify unwanted or bad text in a machine readable document, such as the electronic document 120 of FIG. 1, and to remove such text from the electronic document 120 in order to create a cleaned document 180.

The document cleaning module 280 receives a machine readable document, such as the electronic documents 120 (FIG. 1), as an input and identifies text that should be removed from those electronic documents 120.

In at least some embodiments, the document cleaning module 280 is configured to segment a document into sentences and to then classify each sentence as either a good sentence or a bad sentence. Bad sentences (which may also be referred to as unwanted sentences) are sentences which consist of unwanted text.

In at least some embodiments, a sentence may be said to be unwanted if that sentence does not relate to other text in the document. In at least some embodiments, a sentence may be said to be unwanted if it composed of extraneous text. By way of example and not limitation, if the electronic document 120 comprises a story, bad sentences may be sentences which are unrelated to the story.

The demarcation between a good sentence and a bad sentence may vary in specific embodiments and other criteria may be used in order to determine whether a sentence is, in any given embodiment, a good sentence or a bad sentence.

The electronic documents 120 may be stored locally in memory 250 of the document cleaning system 160 or may be retrieved from remote locations, such as the document servers 114 of FIG. 1.

The document cleaning system 160 and, in some embodiments, the document cleaning module 280 may be comprised of a training module 232 and a recognition module 234. The training module 232 may be an offline process (i.e. network 104 connectivity may not be required), which is used to train a machine-learning classifier 230 to recognize unwanted text, in the form of bad sentences, in electronic documents 120. That is, the training module 232 may rely on locally stored training data 282 which may be stored in a data 270 area of the memory 250.

It will be appreciated that, in some embodiments, the training data 282 may be stored remotely; for example, on a document server 114. In such embodiments, the training module 232 may be an online process which may rely on network 104 connectivity.

The training data 282 is comprised of one or more electronic documents for which unwanted (or bad) sentences have already been identified. The unwanted (or bad) sentences may have been previously identified, for example, by manual parsing of an electronic document. For example, prior to training, a set of electronic documents 120 may be scanned by an operator in order to identify unwanted (or bad) sentences within the electronic document 120. The unwanted (or bad) sentences which are identified may be labelled as unwanted (or bad) sentences within the training data 282. That is, an annotation may be associated with one or more sentence in the electronic document 120 in order to indicate that the sentence has been identified as unwanted or bad. Such an annotation may be referred to as a bad sentence or bad text label. Other labels are also possible.

It will also be appreciated that bad sentences may also, in at least some embodiments, be identified by identifying and labelling good sentences. In such embodiments, sentences which are not labelled good sentences are thus bad sentences. The bad sentence labels, or good sentence labels may more generally be referred to as sentence status labels.

By way of example, in at least one embodiment, a bad sentence label may be comprised of square brackets. An example of such an electronic document 120 may include:

[Boston Globe™—] Stimulus Credited for Lifting Economy, But Worries About . . .

[Washington Post™]

Half a year after Congress enacted the largest economic stimulus . . .

FACT CHECK: Biden ignores problems with stimulus

Biden: Stimulus program a success. Biden Defends Results of Stimulus

[TIME™—Christian Science Monitor™—Examiner.com™]

[all 905 news articles]

In this example, the text enclosed within brackets is a bad sentence. In this example, the bad sentences consist of portions of the document 120 which do not contain content related to the wanted or good sentences in the document. For example, the bad sentences may contain information about sources of content in the document (i.e. Boston Globe™) Similarly, the bad sentences may contain other extraneous information (such as, for example, the phrase "all 905 news articles").

Accordingly, the training data 282 may be comprised of an electronic document 120 which identifies bad sentences (for example, with bad sentence labels or other sentence status labels). The bad sentence labels indicate the groups of words in the document 120 which are to be considered to be unwanted or bad. It will be appreciated that the quality of the machine learning classifier 230 after training with the training data 282 will generally vary with the amount of training data 282 that is used to train that machine learning classifier. That is, a larger the amount of training data 282, will generally result in a better-trained machine learning classifier. Accordingly, the training data 282 will comprise a plurality of bad sentences (or other sentence status labels). In at least some embodiments, the training data 282 may be comprised of a single electronic document 120 which contains many bad sentences (and bad sentence labels). In other embodiments, the training data 282 may be comprised of a plurality of electronic documents 120 which collectively contain a plurality of bad sentences.

The machine learning classifier 230 may be of various types. By way of example, the machine learning classifier 230 may be a support vector machine, a naïve bayian classifier, an ADA-boosting classifier or a K nearest neighbourhood classifier.

The recognition module 234 of the document cleaning module 280 may perform an online process which uses the machine learning classifier 230 trained using the training module 232. That is, recognition may be performed on electronic documents 120 (FIG. 1) which are located on remote document servers 114 (FIG. 1). Such remote document servers 114 may be accessed via the network 104.

It will be appreciated that, in some embodiments, the electronic documents 120 may be stored locally; for example, in memory 250. In such embodiments, the recognition module 234 may be an offline process.

The specific functions provided by the document cleaning module 280 will be discussed below in greater detail with respect to FIGS. 3 to 6.

It will be appreciated that the document cleaning system 160 may be comprised of other features, components, or subsystems apart from those specifically discussed herein. By way of example and not limitation, the document cleaning system 160 will include a power subsystem which interfaces with a power source, for providing electrical power to the document cleaning system 160 and its components. By way of further example, the document cleaning system 160 may include a display subsystem (not shown) for interfacing with a display, such as a computer monitor and, in at least some embodiments, an input subsystem (not shown) for interfacing with an input device. The input device may, for example, include an alphanumeric input device, such as a computer keyboard and/or a navigational input device, such as a mouse.

It will also be appreciated that the modules 260 may be logically or physically organized in a manner that is different from the manner illustrated in FIG. 2. By way of example, in some embodiments, the training module 232 may be separated from the document cleaning module 280.

Figure 3:
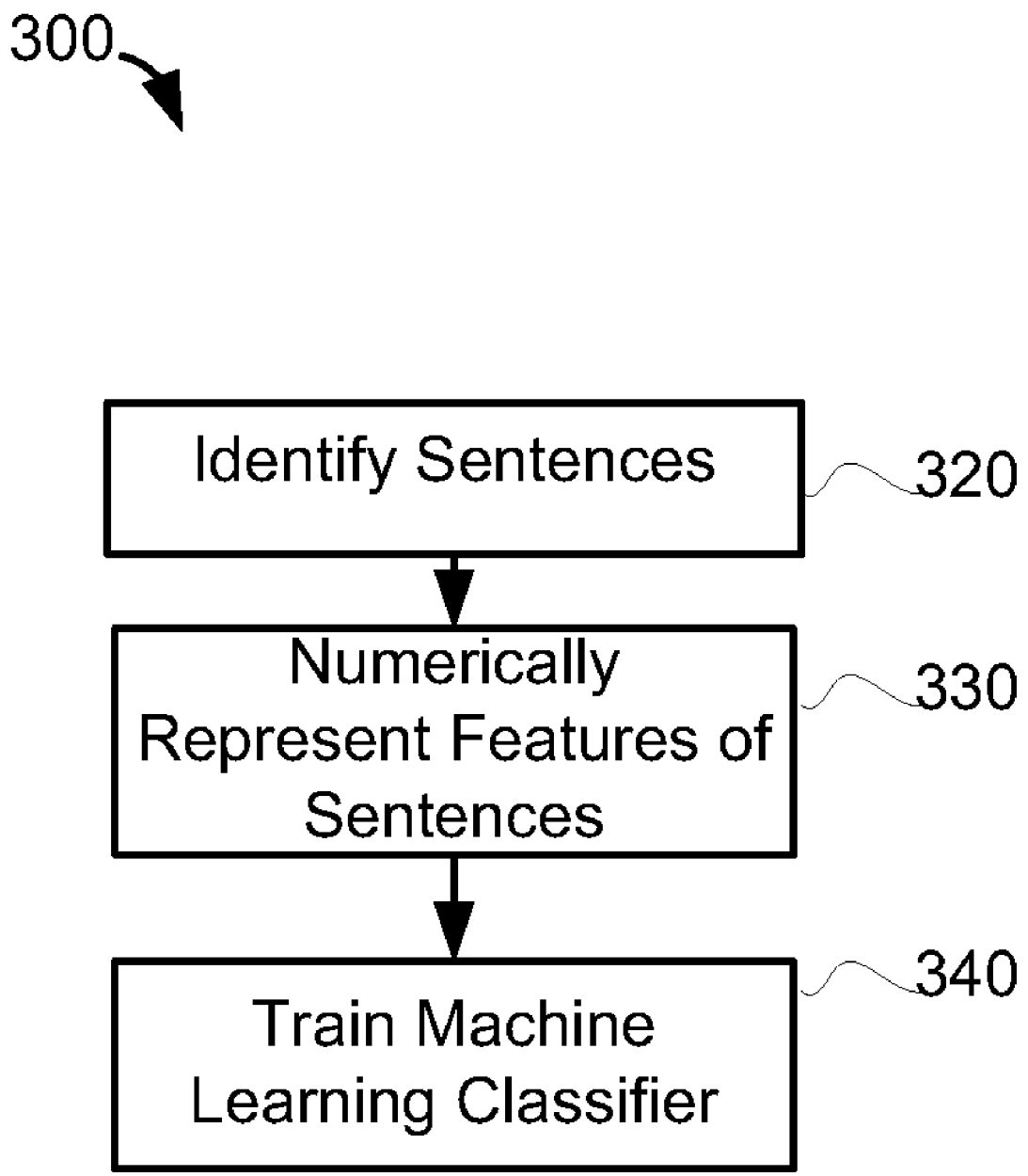
FIG. 3 shows a flowchart of a process for training a machine learning classifier to recognize bad sentences in an electronic document in accordance with an embodiment of the present disclosure.

Referring now to FIG. 3, a process 300 for training a machine learning classifier to recognize unwanted or bad sentences in an electronic document 120 (FIG. 1) is illustrated in flowchart form. The process 300 includes steps or operations which may be performed by the document cleaning system 160 of FIGS. 1 and/or 2. More particularly, the document cleaning module 280 and/or the training module 232 of FIG. 2 may be configured to perform the process 300 of FIG. 3. That is, the document cleaning module 280 and/or the training module 232 may contain instructions for causing the processor 240 to execute the process 300 of FIG. 3.

The process 300 of FIG. 3 receives, as input, the training data 282 (FIG. 2), which may be stored in the memory 250. The process 300 produces, as an output, a machine-learning classifier 230 (FIG. 2).

In the embodiment shown, training is comprised of the following steps: sentence segmentation 320; numeric representation of features of sentences 330; and machine-learning classifier training 340.

First, at step 320, sentences are identified from an electronic document 120 in the training data 282. The identified sentences may be segmented.

By way of example and not limitation, in the example document 120 discussed above, the document 120 may be segmented into the following eight (8) sentences:

1) Boston Globe™—
2) Stimulus Credited for Lifting Economy, But Worries About . . .
3) Washington Post™
4) Half a year after Congress enacted the largest economic stimulus . . .
5) FACT CHECK: Biden ignores problems with stimulus
6) Biden: Stimulus program a success. Biden Defends Results of Stimulus
7) TIME™—Christian Science Monitor™—Examiner. com™
8) all 905 news articles The segmentation of sentences in step 320 may occur automatically. That is, the segmentation of sentences in step 320 is performed by the document cleaning system 160 without the need for a user or operator to manually identify sentences.

The segmentation of sentences in step 320 may occur according to a variety of methods. In some embodiments, the sentences may be segmented in accordance with one or more predetermined rules. By way of example, the rules may specify one or more characters or symbols or combination of characters or symbols which are interpreted as a sentence break. One such character may be the period (.) character. Accordingly, step 320 may include a step of identifying characters in the electronic document 120 (FIG. 1) which corresponds to one or more predefined sentence break characters.

In some embodiments, sentence identification may be based simply on the rules identified above. For example, a period may be interpreted as a sentence break. In other embodiments, further analysis may be performed on the document 120 to determine whether the identified characters should, in fact, be interpreted as sentence breaks.

Such further analysis may include, for example, determining, with a second machine learning classifier (not shown), whether the identified characters should, in fact, be considered sentence breaks. The second machine learning classifier may be a machine learning classifier that is pre-trained to recognize sentence breaks. The second machine learning classifier may be, for example, trained using training documents (not shown) which contain sentence break labels indicating characters or combinations of characters which are to be regarded as sentence breaks.

In other embodiments, other analysis may be performed in order to determine whether a character which corresponds to a predetermined sentence break character, should, in fact, be interpreted as a sentence break. For example, in at least some embodiments, a hidden markov model (HMM) may be performed in order to determine whether a character (such as a predetermined punctuation or symbol) is a sentence break.

After sentences have been identified, at step 330, features of the sentences may be numerically represented in order to obtain a numeric feature representation associated with each sentence identified at step 320.

The numeric feature representation numerically represents one or more features of the sentence. The numeric feature representation may be of a vector format. Features that are represented by the numeric feature representation may include, for example, any combination of the following: one or more part-of-speech associated with one or more words of the sentence (i.e. whether the word is a noun, verb, etc.), whether the sentence or parts thereof satisfy one or more rules or criteria (i.e. whether there are any words in the sentence that are dates or times, etc.), one or more unique identifier associated with each word in the sentence, whether a sentence preceding the current sentence was a bad sentence, an indicator of the position of the current sentence within the document 120.

The numeric feature representation and the step 330 of numerically representing features of the sentences will be discussed in greater detail below with respect to FIGS. 5 and 6.

Next, at step 340, a machine learning classifier 230 (FIG. 2) is trained using the numeric feature representations obtained at step 330 and the bad sentence labels (or other sentence status labels) associated with the document 120 in the training data 282.

The machine learning classifier 230 may be of various types. By way of example, the machine learning classifier 230 may be a support vector machine, a naïve bayian classifier, an ADA-boosting classifier or a K nearest neighbourhood classifier.

After the machine learning classifier 230 (FIG. 2) has been trained (for example, according to the process 300 of FIG. 3), the machine learning classifier 230 may be used by the recognition module 234 to identify bad sentences in electronic documents 120 which do not include bad sentence labels (or other sentence status labels). That is, the machine learning classifier 230 may be used to recognize bad sentences in electronic documents 120, such as the electronic documents 120 obtained from remote document servers 114 (FIG. 1). The recognition module 234 may receive, as an input, an electronic document 120 which does not have bad sentence labels (or other sentence status labels) associated therewith and may identify bad sentences contained therein.

Figure 4:
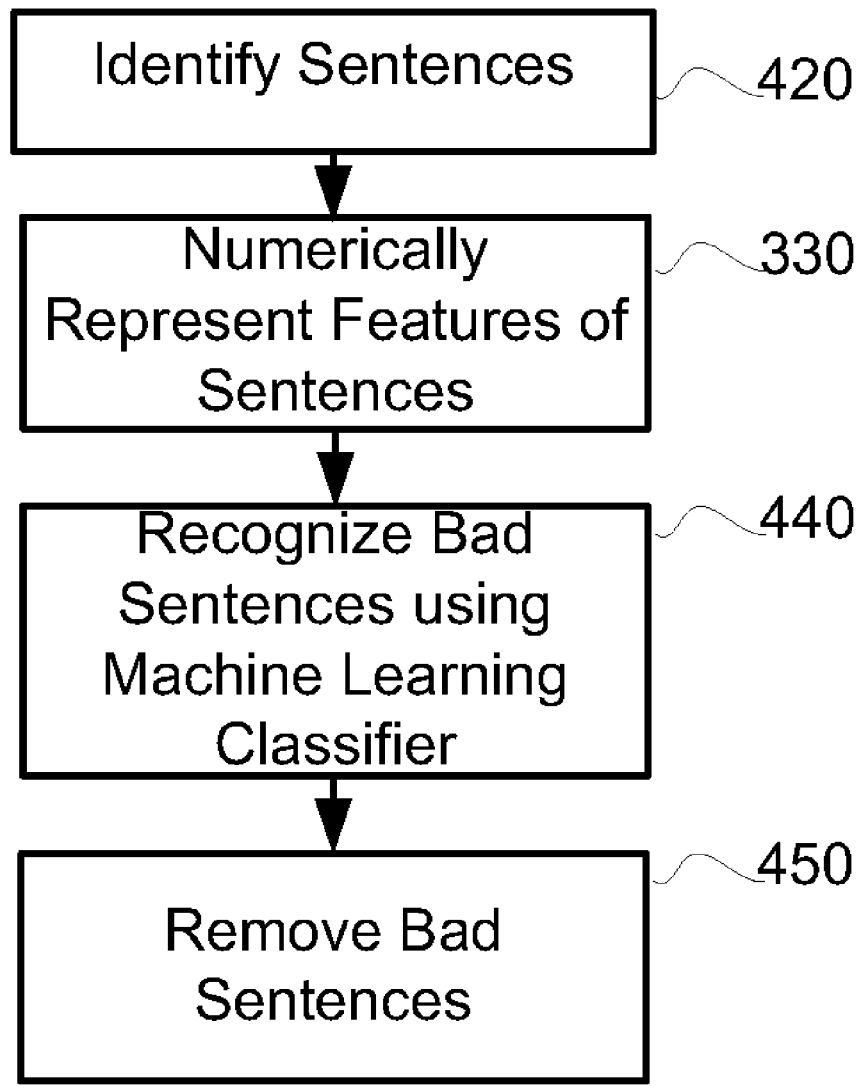
FIG. 4 shows a flowchart of a process for removing bad sentences in an electronic document using a machine learning classifier in accordance with an embodiment of the present disclosure.

Referring now to FIG. 4, a process 400 for cleaning an electronic document 120 (FIG. 1) using a machine learning classifier 230 (FIG. 2) is illustrated in flowchart form. The process 400 includes steps or operations which may be performed by the document cleaning system 160 of FIGS. 1 and/or 2. More particularly, the document cleaning module 280 and/or the recognition module 234 of FIG. 2 may be configured to perform the process 400 of FIG. 4. That is, the document cleaning module 280 and/or the recognition module 234 may contain instructions for causing the processor 240 to execute the process 400 of FIG. 4.

In the embodiment shown, document cleaning is comprised of the following steps: sentence identification 420; numeric representation of features of sentences 330; and recognition 440 using the machine learning classifier 230 (FIG. 2).

First, at step 420, sentences are identified from an electronic document 120 which is received by the recognition module 234.

The step 420 of identifying sentences in the process 400 of FIG. 4 is similar to the step 320 of identifying sentences in the process 300 of FIG. 3, except in that the electronic document 120 to which the step 420 of identifying sentences in FIG. 4 is applied does not, generally, have any previously existing bad sentence labels (or other sentence status labels). That is, the electronic document 120 received by the recognition module 234 in the process 400 of FIG. 4 differs from the electronic document 120 received by the training module 232 in the process 300 of FIG. 3 in that the electronic document 120 received by the recognition module 234 does not have any associated bad sentence labels (or other sentence status labels) indicating the phrases in the electronic document 120.

By way of example and not limitation, in the example document 120 discussed above, the document 120 may be segmented into the following eight (8) sentences:

1) Boston Globe™—
2) Stimulus Credited for Lifting Economy, But Worries About . . .
3) Washington Post™
4) Half a year after Congress enacted the largest economic stimulus . . .
5) FACT CHECK: Biden ignores problems with stimulus
6) Biden: Stimulus program a success. Biden Defends Results of Stimulus
7) TIME™—Christian Science Monitor™—Examiner. com™
8) all 905 news articles The segmentation and/or identification of sentences in step 420 may occur automatically. That is, the segmentation of sentences in step 420 is performed by the document cleaning system 160 without the need for a user or operator to manually identify sentences.

The segmentation of sentences in step 420 may occur according to a variety of methods. In some embodiments, the sentences maybe segmented in accordance with one or more predetermined rules. By way of example, the rules may specify one or more characters or symbols or combination of characters or symbols which are interpreted as a sentence break. One such character may be the period (.) character. Accordingly, step 320 may include a step of identifying characters in the electronic document 120 (FIG. 1) which corresponds to one or more predefined sentence break characters.

In some embodiments, sentence identification may be based simply on the rules identified above. For example, a period may be interpreted as a sentence break. In other embodiments, further analysis may be performed on the document 120 to determine whether the identified characters should, in fact, be interpreted as sentence breaks.

Such further analysis may include, for example, determining, with a second machine learning classifier (not shown), whether the identified characters should, in fact, be considered sentence breaks. The second machine learning classifier may be a machine learning classifier that is pre-trained to recognize sentence breaks. The second machine learning classifier may be, for example, trained using training documents (not shown) which contain sentence break labels indicating characters or combinations of characters which are to be regarded as sentence breaks.

In other embodiments, other analysis may be performed in order to determine whether a character which corresponds to a predetermined sentence break character, should, in fact, be interpreted as a sentence break. For example, in at least some embodiments, a hidden markov model (HMM) may be performed in order to determine whether a character (such as a predetermined punctuation or symbol) is a sentence break.

After sentences have been identified, at step 330, features of the sentences may be numerically represented in order to obtain a numeric feature representation associated with the sentences identified at step 320.

The step 330 of FIG. 4 may correspond to the step 330 of FIG. 3. As noted previously with respect to the discussion of FIG. 3, the numeric feature representation and the step 330 of numerically representing features of the sentences will be discussed in greater detail below with respect to FIGS. 5 and 6.

Next, at step 440, the machine learning classifier 230 may be used to recognize bad sentences in the electronic document 120. That is, the numeric feature representation obtained at step 330 of FIG. 4 may be input to the machine learning classifier 230 to classify each sentence as either a "good sentence" or a "bad sentence" (or some other equivalent label). That is, at step 440, the machine learning classifier 230 is used to identify bad sentences in the electronic document 120.

Next, at step 450, the document cleaning system 160 may create a cleaned document 180 which includes good sentences but which does not include bad sentences. This may be done, for example, by removing the sentences identified as bad sentences from the document. The cleaned document may be saved to storage 190 (FIG. 1)

The storage 190 may, in some embodiments, be internal storage of the document cleaning system 160. In other embodiments, the storage 190 may be external storage of the document cleaning system 160, including, for example, network storage accessible through a network 104.

Figure 5:
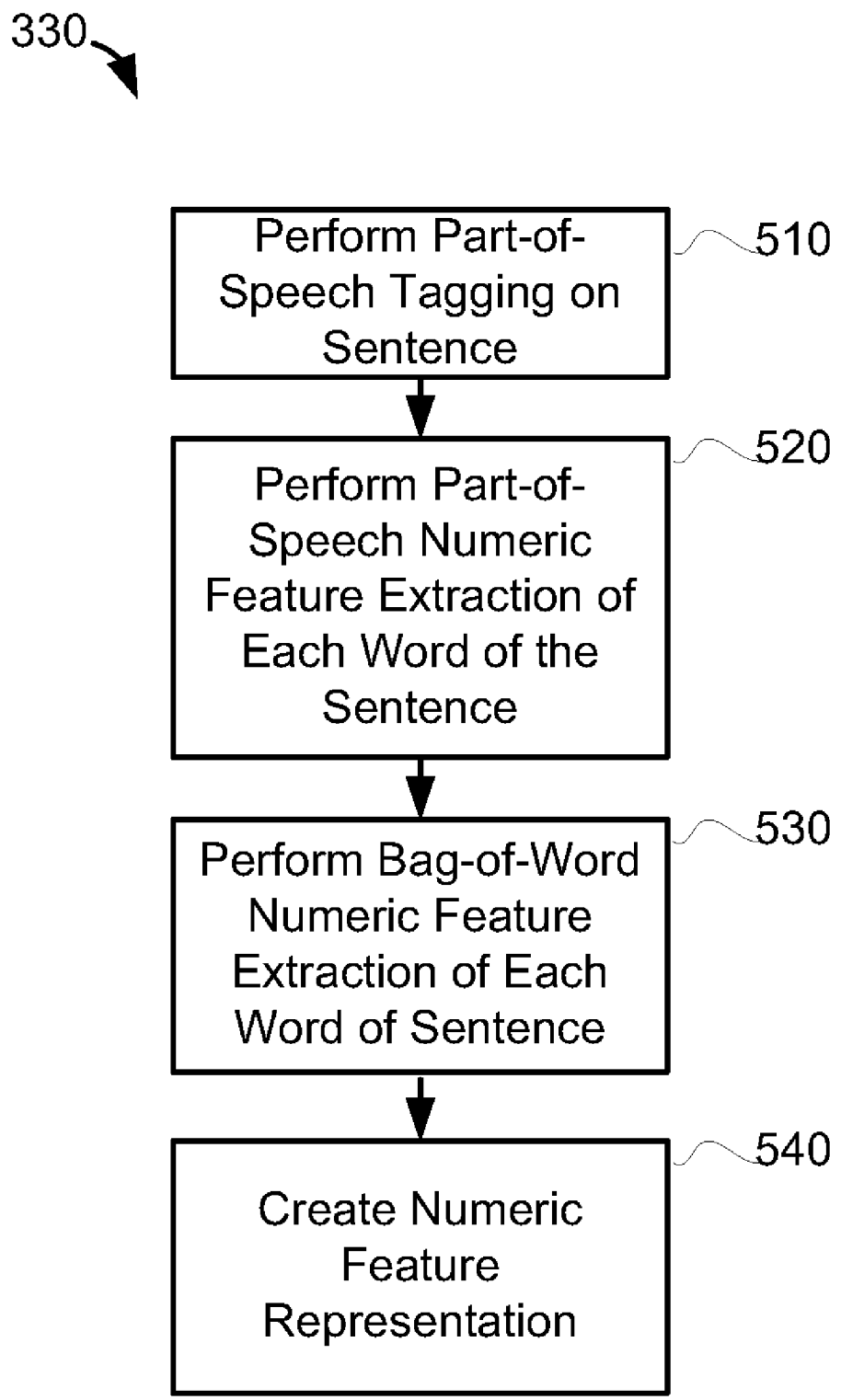
FIG. 5 shows a process for obtaining a numeric feature representation for a sentence in accordance with an embodiment of the present disclosure.

Referring now to FIG. 5, an embodiment of the step 330 of numerically recognizing features of one or more sentences, which was briefly discussed above with reference to FIGS. 3 and 4, will be discussed in greater detail. A flowchart of an embodiment of the step 330 is illustrated.

In the step 330 of FIG. 5, a numeric feature representation of a sentence is created based on part-of-speech tagging of the words in the sentence. The step 330 includes steps or operations which may be performed by the document cleaning system 160 of FIGS. 1 and/or 2. More particularly, the document cleaning module 280 and/or the training module 232 and/or the recognition module 234 of FIG. 2 may be configured to perform the step 330 of FIG. 5. That is, the document cleaning module 280 and/or the recognition module 234 and/or the training module 232 may contain instructions for causing the processor 240 to execute the step 330 of FIG. 5.

First, at step 510, at least some of the words contained in the sentence may be automatically analyzed and tagged by the document cleaning system 160 (FIG. 2) using part-of-speech tagging. Part-of-speech tagging is a process of marking up the words in the electronic document 120 based on the word's definition and/or context. By way of example, part-of-speech tagging may recognize whether a word is one of: a cardinal number, a determiner, an existential there, a foreign word, a preposition or subordinating conjunction, and adjective, an adjective comparative, an adjective superlative, a list item marker, a modal, a noun (and/or the type of noun i.e. proper noun, plural, singular, etc.), a predeterminer, a possessive ending, a personal pronoun, a possessive pronoun, an adverb, an adverb comparative, an adverb superlative, a particle, a symbol, an interjection, a verb (and/or the type of verb i.e. base form, past tense, gerund, past participle, non-3rd person singular present, 3rd person singular present), a wh-deterimer, a wh-pronoun, and/or whether the word is a contains a specific type of punctuation (i.e. a numbers sign (#), a dollar sign ($), a quotation mark ("), a parenthesis, etc.). It will be appreciated that these examples are merely illustrative and that other part-of-speech tags are also possible.

By way of example and not limitation, an example of a tagged document may be:

Both/DT Westwood/NNP Brick/NNP and/CC Westwood/ NNP Group/NNP are/VBP based/VBN in/IN Boston/ NNP where DT represents a word that is a determiner; NNP represents a singular proper noun; CC represents a coordinating conjunction; VBP represents a Verb, non-3rd person singular present; VBN represents a verb, past participle; IN represents a preposition or subordinating conjunction.

In the example shown, the label following each slash is the part-of-speech tag of that word.

By way of further example, exemplary tags associated with various parts-of-speech which may be used in some embodiments are as follows:

CC=Coordinating conjunction; CD=Cardinal number; DT=Determiner; EX=Existential there; FW=Foreign word; IN=Preposition or subordinating conjunction; JJ=Adjective; JJR=Adjective, comparative; JJS=Adjective, superlative; LS=List item marker; MD=Modal; NN=Noun, singular or mass; NNS=Noun, plural; NNP=Proper noun, singular; NNPS=Proper noun, plural; PDT=Predeterminer; POS=Possessive ending; PRP=Personal pronoun; PRP_=Possessive pronoun; RB=Adverb; RBR=Adverb, comparative; RBS=Adverb, superlative; RP=Particle; SYM=Symbol; TO=to; UH=Interjection; VB=Verb, base form; VBD=Verb, past tense; VBG=Verb, gerund or present participle; VBN=Verb, past participle; VBP=Verb, non-3rd person singular present; VBZ=Verb, 3rd person singular present; WDT=Wh-determiner; WP=Wh-pronoun; WP_=Possessive wh-pronoun; WRB=Wh-adverb; PUNC_SHARP=#; PUNC_DOLLAR=$; PUNC_LASTQUOTE="; PUNC_FIRSTPAREN=(; PUNC_LASTPAREN=); PUNC_COMMA=,; PUNC_STOP=.; PUNC_SEMICOMMA=:; PUNC_FIRSTQUOTE='; OTHER=others Next, at step 520, numeric feature extraction of each word in the sentence for which a numeric feature representation is currently being created is performed. The step 520 may rely on a predetermined part-of-speech map which associates each part-of-speech which the system is configured to recognize at step 510 with a unique number. The number is, in at least some embodiments, an integer number. This predetermined part-of-speech map may, for example, be stored in the memory 250 of FIG. 2.

Using the example illustrated above, an example part-of-speech map which maps parts-of-speech (and/or part-of-speech tags) to numbers may be as follows:

CC=Coordinating conjunction=1; CD=Cardinal number=2; DT=Determiner=3; EX=Existential there=4; FW=Foreign word=5; IN=Preposition or subordinating conjunction=6; JJ=Adjective=7; JJR=Adjective, comparative=8; JJS=Adjective, superlative=9; LS=List item marker=10; MD=Modal=11; NN=Noun, singular or mass=12; NNS=Noun, plural=13; NNP=Proper noun, singular=14; NNPS=Proper noun=15, plural; PDT=Predeterminer=16; POS=Possessive ending=17; PRP=Personal pronoun=18; PRP_=Possessive pronoun=19; RB=Adverb=20; RBR=Adverb, comparative=21; RBS=Adverb, superlative=22; RP=Particle=23; SYM=Symbol=24; TO=to=25; UH=Interjection=26; VB=Verb, base form=27; VBD=Verb, past tense=28; VBG=Verb, gerund or present participle=29; VBN=Verb, past participle=30; VBP=Verb, non-3rd person singular present=31; VBZ=Verb, 3rd person singular present=32; WDT=Wh-determiner=33; WP=Wh-pronoun=34; WP_=Possessive wh-pronoun=35; WRB=Wh-adverb=36; PUNC_SHARP=#=37; PUNC_DOLLAR=$=38; PUNC_LASTQUOTE="=39; PUNC_FIRSTPAREN=(=40; PUNC_LASTPAREN=)=41;

PUNC_COMMA=, =42; PUNC_STOP=.=43; PUNC_SEMICOMMA=: =44; PUNC_FIRSTQUOTE='=45; OTHER=others=46

It will, however, be appreciated that the part-of-speech map provided above is merely illustrative and that other mappings are also possible.

At step 520, the part-of-speech map may be used to identify one or more numbers corresponding to the part-of-speech of each word in the sentence for which a numeric feature representation is currently being created.

Using the example provided above, the first word of the sentence (i.e. "Both") is a determiner part-of-speech. Accordingly, using the map provided above, this word would be associated, at step 520, with the number three (3) to represent its part-of-speech.

The part of speech numeric feature extraction step 520 may quantify the frequency of occurrence of each part of speech in the sentence. That is, in at least some embodiments, the step 520 may associate each part-of-speech in the sentence with an occurrence count or frequency of that part-of-speech.

Referring to an example sentence above (i.e. Both Westwood Brick and Westwood Group are based in Boston), there is one determiner, five singular proper nouns, one verb past participle, one preposition or subordinating conjunction, and one verb, non-$3^{rd}$ person singular present. In at least some embodiments, each part of speech in the sentence is mapped to a corresponding number using the part-of-speech map. Each part-of-speech in the sentence is also associated with a quantifier indicating the frequency of occurrence of each part of speech in the sentence. For example, using the sentence above (i.e. Both Westwood Brick and Westwood Group are based in Boston), the parts of speech in the sentence may be represented as:

[(3,1), (6,1), (14, 5), (30, 1), (31, 1)]

This representation indicates, in vector format, the occurrence of each part-of-speech in the sentence. For example, it indicates that there is one occurrence of a determined part-of-speech (which is mapped to the number three (3)), there are five occurrences of singular proper nouns (which are mapped to the number fourteen (14)), there is one occurrence of a verb, past particle (which is mapped to the number thirty (30)), there is one occurrence of a verb, non-$3^{rd}$ person singular (which is mapped to the number thirty-one (31)), and there is one occurrence of a preposition or subordinating conjunction. In this example, the number associated with a part of speech in the part of speech map indicates the location of that part of speech in a vector. The occurrence count is the value at that location.

It will be appreciated that, while the example above illustrates the use of sparse vectors in order to represent the occurrence of parts-of-speech in the sentence, other formats of numeric vectors may be used in other embodiments.

It will be appreciated that the size of the vector created at step 520 which numerically identifies the occurrence of parts of speech in a sentence, will be related to the number of unique parts-of-speech in the part-of-speech map. For example, if the part-of-speech map includes $K_p$ unique parts-of-speech, then the dimension of the vector may be $K_p$.

Next, at step 530, in at least some embodiments, a bag-of-word numeric feature extraction may be performed for each word in the sentence. The bag-of-word numeric feature extraction step quantifies the frequency of occurrence of each word in the sentence.

The bag-of-word numeric feature extraction relies on a predetermined dictionary map which maps words to unique numbers. That is, the dictionary map is a set of words in which each word is mapped to a corresponding number. By way of example and not limitation, the following is an example dictionary map:

"a"=1
"an"=2
"Biden"=3
...
"zoo"=546

The dictionary map may be saved in the memory 250 (FIG. 2) of the document cleaning system 160.

Accordingly, in some embodiments, at step 530, the dictionary map may be used to determine a number associated with each word in the sentence. A vector may be created based on each number that is determined, from the dictionary map, to correspond to the word in the sentence. The size of the numeric feature vector created at step 530 may be related to the number of words and/or unique numbers in the dictionary map. By way of example, a dictionary map with a size of 546 words, such as the example dictionary map above, may, in some embodiments, be of the $546^{th}$ dimension. It will, however, be appreciated that vectors of a different size could also be used.

In at least some embodiments, the step 530 may associate each word in the sentence with an occurrence count or frequency of that word. For example, if we consider the sentence "Biden Defends Results of Stimulus", at step 530, each word may be mapped to a corresponding number based on the dictionary may. For example, in one possible dictionary map, "Biden" may map to the number three (3), "Defends" may map to the number twenty-three (23), "Results" may map to the number four-hundred and fifteen (415), "of" may map to the number two hundred and forty-six (246), and "stimulus" may map to the number five-hundred and two (502). It will be appreciated that this mapping is merely illustrative and that other mappings are also possible.

Since each of the words in the example (i.e. Biden, Defends, Results, of, Stimulus) occur only once, each word may be associated with an occurrence count of one.

For example, using a sparse vector representation, the example sentence could be represented as:

[(3,1),(23,1),(246,1),(415,1),(502,1)]

Alternatively, in some embodiments, each word in the sentence may be associated with a frequency which indicates how often that word occurs as compared with the total number of words in the sentence. For example, the frequency of occurrence of any word may be determined by dividing the number of occurrences of that word in the sentence by the total number of words in the sentence.

For example, using a sparse vector representation, the example sentence considered above (Biden Defends Results of Stimulus) could be represented as:

[(3,0.2),(23,0.2),(246,0.2),(415,0.2),(502,0.2)]

It will be appreciated that, while sparse vectors have been used in the example above, other formats of numeric vectors may be used in other embodiments.

In these examples, the number associated with a word in the dictionary map indicates its position in the numeric feature vector. Similarly, the count or frequency associated with that word is the value in the vector at that location.

Next, at step 540, a numeric feature representation for a sentence is created. The numeric feature representation is created based on the numbers identified at step 520 and/or step 530.

In some embodiments, the numeric feature representation may be created by concatenating (or otherwise joining) together the vectors created at step 520 for each word of a sentence and/or the vectors created at step 530 for each context word of the sentence in order to create a larger vector for the sentence. This larger vector numerically represents the part-of-speech of the words of the sentence and possibly the bag of words numeric feature representation of the words of the sentence created at step 530. That is, all of the feature vectors created in the above feature extraction steps for a sentence may be concatenated (or otherwise joined) together in order to create one vector for the sentence.

Figure 6:
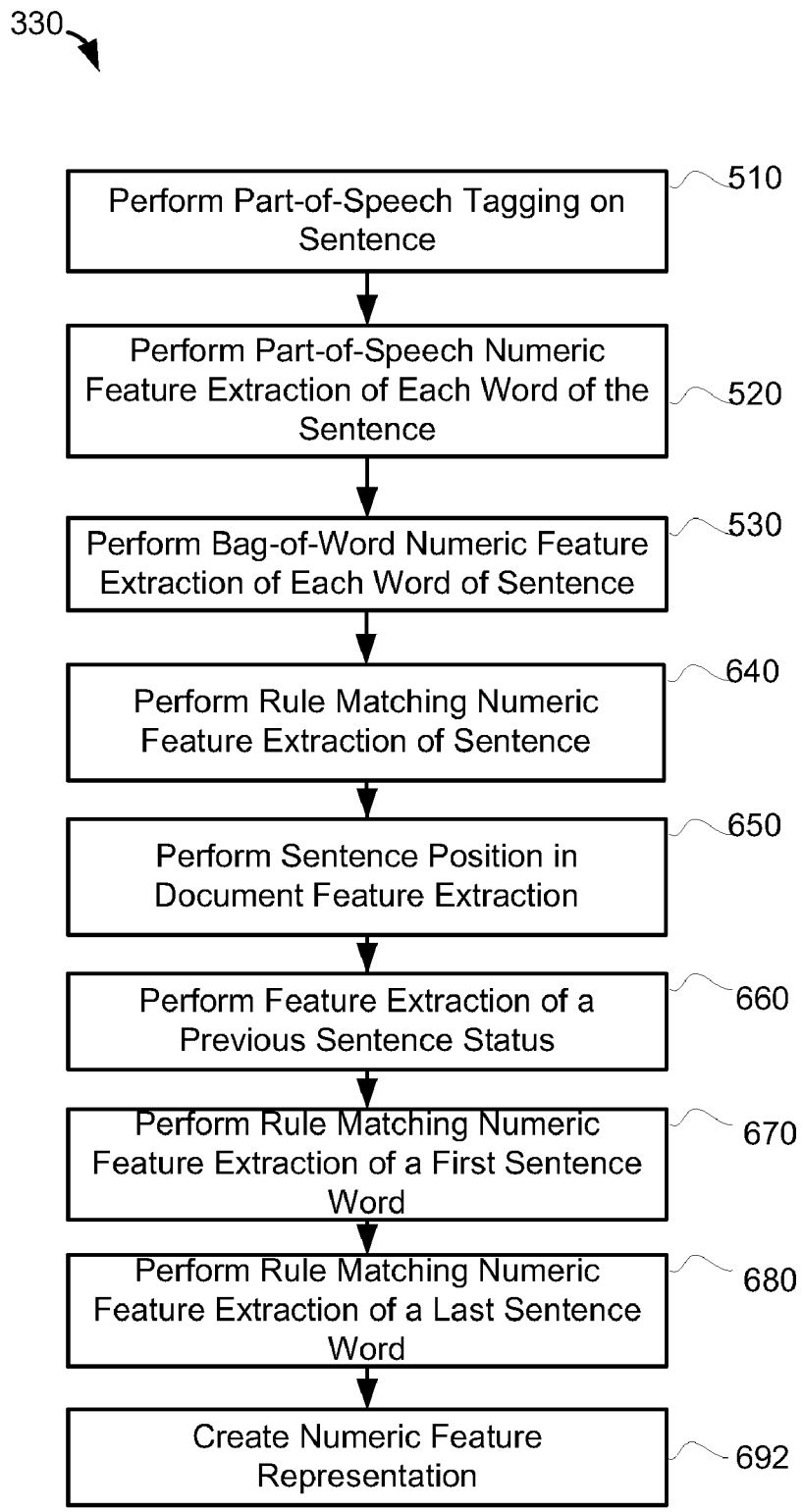
FIG. 6 shows a process for obtaining a numeric feature representation for a sentence in accordance with another embodiment of the present disclosure.

Referring now to FIG. 6, further embodiments of the step 330 of numerically representing features of a sentence, which was briefly discussed above with reference to FIGS. 3 and 4 will be discussed in greater detail. A flowchart of an embodiment of the step 330 is illustrated.

In the step 330 of FIG. 6, a numeric feature representation of a sentence is created based, in part, on part-of-speech tagging of the words in the sentence. The step 330 includes steps or operations which may be performed by the document cleaning system 160 of FIGS. 1 and/or 2. More particularly, the document cleaning module 280 and/or the training module 232 and/or the recognition module 234 of FIG. 2 may be configured to perform the step 330 of FIG. 6. That is, the document cleaning module 280 and/or the recognition module 234 and/or the training module 232 may contain instructions for causing the processor 240 to execute the step 330 of FIG. 6.

The embodiment of FIG. 6 differs from the embodiment in FIG. 5 in that the embodiment of FIG. 6 includes additional steps which are not discussed with respect to FIG. 5. These additional steps extract additional features from the electronic document 120.

As with the embodiment of FIG. 5, the embodiment of FIG. 6 may include a step 510 in which the words contained in the sentence may be tagged using part-of-speech tagging.

Similarly, at step 520, the part-of-speech map may be used to identify one or more numbers corresponding to the part-of-speech of each word in the sentence for which a numeric feature representation is currently being created. In at least some embodiments, a vector which represents the frequency of occurrence of each part-of-speech tag of the sentence may be created.

Steps 510 and 520 are discussed in greater detail above with reference to FIG. 5.

As with the embodiment of FIG. 5, the embodiment of FIG. 6 may include a step 530 of performing a bag-of-word numeric feature extraction for each word in the sentence. The bag-of-word numeric feature extraction step maps each word contained in the sentence to an associated numbers using a dictionary map and quantifies the frequency of occurrence of each word in the sentence. Step 530 is discussed in greater detail above with respect to FIG. 5.

In some embodiments, at step 640, rule matching may be performed on one or more words of the sentence to determine whether the sentence satisfies one or more predetermined rules. In at least some embodiments, the rule matching may count the number of times a rule is satisfied by a sentence. That is, the sentence, or each word in the sentence may be evaluated against a rule in a rule set to determine whether the sentence or word satisfies the rule. A vector may be created based on the result in order to numerically indicate the result.

In various embodiments, the rules may include any one or more of the following rules. For example, in at least some embodiments, the rules may include a rule which examines each word in the sentence in order to count the number of words in the sentence in which the first letter of the word is capitalized. A vector may be created based on the resulting count.

In some embodiments, the rules may include a rule which examines each word in the sentence in order to count the number of words in the sentence in which all letters of the word are capitalized. A vector may be created based on the resulting count in order to numerically indicate the resulting count.

Similarly, in some embodiments, the rules may include a rule which examines each word in the sentence in order to count the number of words which contain digits. A vector may be created based on the resulting count in order to numerically indicate the resulting count.

Similarly, in at least some embodiments, the rules may include a rule which examines each word in the sentence in order to count the number of words in which all characters of the word are a digit. A vector may be created based on the resulting count in order to numerically indicate the resulting count.

Similarly, in at least some embodiments, the rules may include a rule which examines each word in the sentence in order to count the number of words which are stop words. A stop word is a word that is so common that it can be ignored. For example, in various embodiments, any one or more of the following may be stop words: "the", "a", "an", "of", "with". Other stop words are also possible. In order to determine whether the words in the sentence are stop words, the words in the sentence may be compared to a stop word list which lists all recognized stop words. The stop word list may, for example, be stored in memory 250 (FIG. 2) of the document cleaning system 160. A vector may be created based on the resulting count in order to numerically indicate the number of words in the sentence that are stop words.

Similarly, in at least some embodiments, the rules may include a rule which examines each word in the sentence in order to count the number of words that are dates and/or times. A vector may be created based on the resulting count in order to numerically indicate the number of words in the sentence that are dates and/or times.

Similarly, in at least some embodiments, the rules may include a rule which examines the sentence in order to determine the number of characters in the sentence corresponding to predetermined punctuation marks. Punctuation marks are characters or groups of characters which are typically used to indicate the structure, organization, intonation and/or pauses to be observed in the sentence. The predetermined punctuation marks may include, for example, any one or more of the following characters: apostrophe (' '), brackets ([ ], ( ), { }, ⟨ ⟩), colon (:), comma (,), dashes (-, -, -, -), ellipses ( . . . , . . . ), exclamation mark (!), full stop/period (.), guillemets (<< >>), hyphen (-, -), question mark (?), quotation marks (' ', " "), semicolon (;), slash/stroke (/), solidus (/). Other punctuation marks or characters are also possible. A vector may be created based on the resulting count in order to numerically indicate the number of punctuation marks in the sentence.

Similarly, in at least some embodiments, the rules may include a rule which examines each word in the sentence in order to count the number of words which are uniform resource locators ("URL"). A vector may be created based on the resulting count in order to numerically indicate the number of words that are URLs.

Similarly, in at least some embodiments in which the documents 120 may include references to news services, the rules may include a rule which examines the sentence to determine whether the sentence includes any references to a news service. In at least some embodiments, the number of characters in the reference to the news service in the sentence may be counted. For example, if the sentence references a news service called "News1", the number of characters in the reference to the news service is four. A vector may be created based on the resulting count in order to numerically indicate whether the sentence contains a reference to a news service and possibly how long that reference to the news service is.

Similarly, in at least some embodiments, the rules may include a rule which examines portions of the sentence in order to determine whether that portion of the sentence corresponds to a phrase on a predetermined phrase list. The predetermined phrase list may be comprised of one or more phrases which do not relate to the content of the document. By way of example, any one or more of the following phrases may, in various embodiments, be included in the phrase list: addlinkhere, all rights reserved, and more, article, articles, author:, browse more photos, browse photos, by, click here, click here to find out more, click on, comment, commented by, comments, complete story, continue read, continue reading, contributed to this report, copyright, correspondent, day, digg this, discuss this topic, email this, email us at, feel free to comment, feel free to comment and send us, feel free to comment and send us your thoughts, feel free to comment and send us your thoughts on, find more, follow me on twitter, follow this, forum, forums, for detailed information, for media information, for more details, for more information, for more on, for other uses prior permission required, for personal noncommercial use only, image:, image by, image credit, join us on facebook and twitter, keep reading, news, news articles, no description available, note to editors, our view, permalink, photo:, photograph:, photo by, photo gallery:, photos:, photos by, please contact, please visit, please see, please read the full story, post, posted by, posts, press, printer friendly, read full story, read it here, read more, read our story, read the entire review, read the rest, read the rest of, read the rest of this story, read the rest of this post, report, see terms of use, source, story, stories, subscribe to rss feed, subscribe to, thread, threads, uploaded picture:

A vector may be created based on the resulting count in order to numerically indicate the number of phrases in the sentence which are included on the predetermined phrase list.

It will be appreciated that other rules are also possible.

Furthermore, it will be appreciated that any of the counts in any of the rules discussed above may be specified in terms of an integer based count indicating the number of times a given rule has been satisfied by a sentence or may also be specified in terms of a frequency of occurrence relative to a total possible number of occurrences. For example, the result any of the rules which are evaluated against each word may be expressed in terms of a frequency determined by dividing the total number of words satisfying the rule by the total number of words in the sentence.

Where there are multiple rules, the vectors created by evaluating each rule against the sentence may be joined together to form a larger vector. The size of this larger vector will be related to the number of rules in the rule set. For example, a rule set of size M may result in a vector of M dimensions. Each rule may have a predetermined position in this vector.

Since the vectors which are created in the numeric feature extraction steps of FIGS. 5 and 6 are, later, passed to the machine learning classifier 230 (FIG. 2) (See, for example, step 440 of FIG. 4), in order to ensure accurate learning, the vectors are presented in a predetermined consistent form. That is, each position in the vectors corresponds to the same feature for any given sentence. Accordingly, the concatenation of any of the vectors created is performed in a predetermined manner which maintains consistent vector positions for features.

Next, in some embodiments, at step 650 sentence-position-in-document feature extraction may be performed on the sentence. In this step, the position of the sentence in the document 120 is determined and numerically represented. The position of the sentence in the document 120 may be determined in terms of a count of a number of sentences from the start of the document to the current sentence, or the number of sentences from the end of the document to the current sentence. In other embodiments, the position of the sentence may be determined relative to the total number of sentences in the document. For example, the first sentence may have a position of zero and the last sentence may have a position of $(L-1)/L$, where L is the total number of sentences in the document. Other numerical indicators may also be used.

A vector may be created based on the numerical indicator to numerically identify the position of the sentence in the document 120.

Next, in at least some embodiments, at step 660, feature extraction of a previous sentence status may be performed. In this step, a vector may be created which identifies whether the sentence immediately preceding the current sentence was determined, by the machine learning classifier, to be a good sentence or whether it was determined to be a bad sentence. Each status (i.e. good sentence or bad sentence) may be assigned a different number and the vector may be set to the number which corresponds to the status of the preceding sentence. For example, in at least some embodiments, the vector may be set to 1 if the preceding sentence was a good sentence and set to 0 if the preceding sentence was a bad sentence.

Next, in at least some embodiments, at step 670, rule matching may be performed the first word of the sentence to determine whether the first word of the sentence satisfies one or more predetermined rules. The rules may, in various embodiments, be any one or more of the rules discussed above with respect to step 640. Other rules are also possible. A vector may be created which numerically indicates whether the first word of the sentence satisfies each of the rules. For example, each rule in the rule set may have a corresponding position in the vector. Accordingly, the dimension of the vector may correspond to the number of rules in the rule set. Binary numbers may be used to numerically indicate whether each of the rules have been satisfied. For example, the number one (1) may be used to indicate that the rule has been satisfied by the first word of the sentence and the number zero (0) may be used to indicate that the rule has not been satisfied by the first word of the sentence. By way of example and not limitation, if the rule set consists of three rules, a first rule, a second rule and a third rule, and if the first word of the sentence is found to satisfy the first rule and the second rule but not the third rule, then the resulting vector may be (1, 1, 0). However, it will be appreciated that other numerical representations and vectors are also possible.

Next, in at least some embodiments, at step 680, rule matching may be performed the last word of the sentence to determine whether the first word of the sentence satisfies one or more predetermined rules. The step 680 is similar to the step 670, except in that the step 680 operates on the last word while the step 670 operates on the first word of the sentence.

In step 680, the rules may, in various embodiments, be any one or more of the rules discussed above with respect to step 640. Other rules are also possible. A vector may be created which numerically indicates whether the last word of the sentence satisfies each of the rules. For example, each rule in the rule set may have a corresponding position in the vector.

Accordingly, the dimension of the vector may correspond to the number of rules in the rule set. Binary numbers may be used to numerically indicate whether each of the rules have been satisfied.

Next, at step 692, a numeric feature representation may be created for the sentence. The numeric feature representation is created in a manner similar to that described above with respect to step 540 of FIG. 5.

The numeric feature representation is created based on the numbers and/or vectors identified at any one or more of steps 520, 530, 640, 650, 660, 670, and/or 680 of FIG. 6.

In some embodiments, the numeric feature representation may be created by concatenating (or otherwise joining) together the vectors created at these various steps in a predetermined manner in order to create a larger vector. This larger vector numerically represents features of the sentence. That is, all of the feature vectors created in the above feature extraction steps for a sentence may be put together in order to create one vector for the sentence. As noted previously, since the vectors which are created in the numeric feature extraction steps of FIGS. 5 and 6 are, later, passed to the machine learning classifier 230 (FIG. 2) (See, for example, step 440 of FIG. 4), in order to ensure accurate learning, the vectors are presented in a predetermined consistent form. That is, each position in the vectors corresponds to the same feature for any given sentence. Accordingly, the concatenation (or other method of joining) of any of the vectors created is performed in a predetermined manner which maintains consistent vector positions for features.

It will be appreciated that variations of the methods and systems described above are also possible. For example, various embodiments may omit some of the steps 510, 520, 530, 640, 650, 660, 670, and/or 680 of FIG. 6 in which various features are identified and vectors are created. In other embodiments, additional features of sentences may be identified apart from those discussed above.

While the present disclosure is primarily described in terms of methods, a person of ordinary skill in the art will understand that the present disclosure is also directed to various apparatus, such as a server and/or a document processing system, including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus and articles of manufacture also come within the scope of the present disclosure.

While the processes 300, 400, and the sub-steps of steps 330 of FIGS. 5 and 6 have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

The various embodiments presented above are merely examples. Variations of the embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method of cleaning an electronic document, the method comprising:
   identifying at least one sentence in the electronic document;
   numerically representing features of the sentence to obtain a numeric feature representation associated with the sentence;
   inputting the numeric feature representation into a machine learning classifier, the machine learning classifier being configured to determine, based on each numeric feature representation, whether the sentence associated with that numeric feature representation is a bad sentence; and
   removing sentences determined to be bad sentences from the electronic document to create a cleaned document,
   wherein numerically representing features of the sentence to obtain a numeric feature representation associated with the sentence comprises:
      creating a part of speech feature vector representation by performing part of speech tagging on each word in the sentence and determining a unique number associated with each part-of-speech corresponding to each word in the sentence, each position in the part of speech feature vector representation indicating a frequency of occurrence of a part of speech tag;
      creating a rule vector feature representation by determining whether the sentence satisfies a plurality of predetermined rules, each position in the rule vector feature representation indicating whether the sentence satisfies a particular one of the plurality of predetermined rules; and
      obtaining the numeric feature representation by concatenating the part of speech feature vector representation and the rule vector feature representation.

2. The method of claim 1, wherein identifying sentences in the electronic document comprises:
   identifying at least one sentence break in the sentence; and
   segmenting the document into sentences in accordance with the sentence break.

3. The method of claim 1 wherein performing part of speech tagging on each word in the sentence comprises:
   identifying part-of-speech tags associated with the sentence.

4. The method of claim 3 wherein numerically representing features of the sentence further comprises:
   counting the number of occurrences of each part of speech in the sentence; and
   creating a numeric feature representation in accordance with the count of the number of occurrences.

5. The method of claim 1 wherein numerically representing features of the sentences comprises:
   identifying, from a dictionary map which maps words to unique numbers, the unique number associated with each word in the sentence; and obtaining a count of the number of occurrences of each word in the sentence;

creating a numeric feature representation in accordance with the unique numbers identified from the dictionary map and the count of the number of occurrences of each word.

6. The method of claim 1 further comprising, prior to identifying:

training the machine learning classifier with training data, the training data including one or more electronic training documents and one or more sentence status labels which identify one or more bad sentences in the electronic training documents.

7. The method of claim 1 wherein at least one of the rules is satisfied when the first letter in a word in the sentence is capitalized, and wherein the numeric feature representation indicates the number of words in the sentence in which the first letter in that word is capitalized.

8. The method of claim 1 wherein at least one of the rules is satisfied when a word contains a date or time, and wherein the numeric feature representation indicates the number of words in the sentence containing a date or time.

9. A document cleaning system for cleaning an electronic document, comprising:

a memory;

one or more processors, configured to:

identify at least one sentence in the electronic document;

numerically represent features of the sentence to obtain a numeric feature representation associated with the sentence;

input the numeric feature representation into a machine learning classifier, the machine learning classifier being configured to determine, based on each numeric feature representation, whether the sentence associated with that numeric feature representation is a bad sentence; and remove sentences determined to be bad sentences from the electronic document to create a cleaned document, wherein numerically representing features of the sentence to obtain a numeric feature representation associated with the sentence comprises:

creating a part of speech feature vector representation by performing part of speech tagging on each word in the sentence and determining a unique number associated with each part-of-speech corresponding to each word in the sentence, each position in the part of speech feature vector representation indicating a frequency of occurrence of a part of speech tag;

creating a rule vector feature representation by determining whether the sentence satisfies a plurality of predetermined rules, each position in the rule vector feature representation indicating whether the sentence satisfies a particular one of the plurality of predetermined rules; and obtaining the numeric feature representation by concatenating the part of speech feature vector representation and the rule vector feature representation.

10. The document cleaning system of claim 9, wherein identifying at least one sentence in the electronic document comprises:

identifying at least one sentence break in the sentence; and segmenting the document into sentences in accordance with the sentence break.

11. The document cleaning system of claim 9, wherein performing part of speech tagging on each word in the sentence comprises:

identifying part-of-speech tags associated with the sentence.

12. The document cleaning system of claim 9, wherein numerically representing features of the sentence further comprises:

counting the number of occurrences of each part of speech in the sentence; and creating a numeric feature representation in accordance with the count of the number of occurrences.

13. The document cleaning system of claim 9, wherein numerically representing features of the sentences comprises:

identifying, from a dictionary map which maps words to unique numbers, the unique number associated with each word in the sentence; and obtaining a count of the number of occurrences of each word in the sentence; and creating a numeric feature representation in accordance with the unique numbers identified from the dictionary map and the count of the number of occurrences of each word.

14. The document cleaning system of claim 9, wherein the one or more processors are further configured to, prior to identifying:

train the machine learning classifier with training data, the training data including one or more electronic training documents and one or more sentence status labels which identify one or more bad sentences in the electronic training documents.

15. The document cleaning system of claim 9, wherein at least one of the rules is satisfied when the first letter in a word in the sentence is capitalized, and wherein the numeric feature representation indicates the number of words in the sentence in which the first letter in that word is capitalized.

16. The document cleaning system of claim 9, wherein at least one of the rules is satisfied when a word contains a date or time, and wherein the numeric feature representation indicates the number of words in the sentence containing a date or time.

* * * * *